United States Patent

Seo (10) Patent No.: US 9,421,997 B2
(45) Date of Patent: Aug. 23, 2016

(54) APPARATUS AND METHOD FOR REMOVING HYSTERESIS OF MOTOR DRIVEN POWER STEERING

(71) Applicant: HYUNDAI MOBIS CO., LTD., Seoul (KR)

(72) Inventor: Jin Qyu Seo, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/318,471

(22) Filed: Jun. 27, 2014

(65) Prior Publication Data

US 2015/0158521 A1    Jun. 11, 2015

(30) Foreign Application Priority Data

Dec. 10, 2013 (KR) ........................ 10-2013-0153477

(51) Int. Cl.
*B62D 5/04* (2006.01)
*H02P 6/10* (2006.01)

(52) U.S. Cl.
CPC ............ *B62D 5/0481* (2013.01); *B62D 5/046* (2013.01); *H02P 6/10* (2013.01)

(58) Field of Classification Search
CPC ........ B62D 5/0481; B62D 5/046; H02P 6/10
USPC ....................................................... 180/443
See application file for complete search history.

(56) References Cited

U.S. PATENT DOCUMENTS

| 6,373,211 | B1 * | 4/2002 | Henry et al. ................. 318/432 |
| 6,407,524 | B1 * | 6/2002 | Endo et al. .................. 318/432 |
| 6,422,335 | B1 * | 7/2002 | Miller .......................... 180/446 |
| 8,606,462 | B2 * | 12/2013 | Nakano ......................... 701/41 |
| 8,831,832 | B2 * | 9/2014 | Hoshi et al. .................... 701/41 |
| 2008/0201041 | A1 * | 8/2008 | Jiang ............................. 701/42 |
| 2011/0166750 | A1 * | 7/2011 | Nakano ......................... 701/41 |
| 2013/0314015 | A1 * | 11/2013 | Hoshi et al. ............. 318/400.23 |

FOREIGN PATENT DOCUMENTS

KR    10-2010-0091770 A    8/2010

* cited by examiner

*Primary Examiner* — Joseph Rocca
*Assistant Examiner* — Michael Stabley
(74) *Attorney, Agent, or Firm* — Knobbe Martens Olson & Bear LLP (57) ABSTRACT

An apparatus for removing hysteresis of motor driven power steering (MDPS) may include: a motor driving unit for rotating a motor; a key on/off sensing unit for sensing a key on/off of a vehicle; and an electronic control unit (ECU) for receiving a key off state of the vehicle from the key on/off sensing unit and repeating a sweep function a preset number of times. The sweep function may include applying a current having an asynchronous frequency, which does not coincide with a synchronous frequency of the motor, to the motor through the motor driving unit.

8 Claims, 10 Drawing Sheets

APPARATUS AND METHOD FOR REMOVING HYSTERESIS OF MOTOR DRIVEN POWER STEERING

CROSS-REFERENCES TO RELATED APPLICATIONS

The present application claims priority to Korean application number 10-2013-0153477, filed on Dec. 10, 2013, which is incorporated by reference in its entirety.

BACKGROUND OF THE INVENTION

The present invention relates to an apparatus and method for removing hysteresis of motor driven power steering (MDPS), and more particularly, to an apparatus and method for removing hysteresis of MDPS, which applies a current having an asynchronous frequency, which does not coincide with a synchronous frequency of a motor, to the motor at high speed within a short time, thereby removing hysteresis of a current sensor which measures the current applied to the motor.

The MDPS may include an electronic control unit (ECU) which receives signals of various sensors such as a torque sensor and various signals within a vehicle, generates a control command containing one or more of a torque command and a current command, transfers the control command to a motor control device within the ECU, and performs torque control for a motor based on the control command.

At this time, real-time feedback information on a rotation state and a load current of the motor may be required to perform the torque control for the motor. In this case, a current sensor of the motor may be used.

That is, the current sensor may convert the magnitude of a motor current corresponding to an actual current flowing in the motor into an induced magnetization, and outputs the induced magnetization as a voltage or current.

However, when the current applied to the motor becomes zero by the property of the current sensor, the induced magnetization may not converge to zero, but hysteresis may remain to thereby generate a current offset deviation.

Thus, a driving device for MDPS has been conventionally designed to compensate for a ripple characteristic corresponding to hysteresis through an algorithm. However, when the MDPS is driven at a light load or large hysteresis remains, a torque ripple or current offset deviation cannot be removed through the conventional compensation algorithm.

That is, even when the ECU is powered off, hysteresis may partially remain. Then, when the ECU is powered on, the remaining hysteresis may generate a current offset deviation. The generated current offset may distort a zero current, and add to a torque ripple caused by a pole/slot combination of the motor.

Thus, the MDPS may be seriously affected by the torque ripple caused by the hysteresis remaining in the current sensor, during current control. Therefore, there is a demand for the development of technology for removing hysteresis.

The related art of the present invention is disclosed in Korean Patent Laid-open Publication No. 10-2010-0091770 published on Aug. 19, 2010 and entitled "Method and apparatus for controlling motor".

SUMMARY OF THE INVENTION

An embodiment of the present invention is directed to an apparatus and method for removing hysteresis of MDPS, which applies a current having an asynchronous frequency, which does not coincide with a synchronous frequency of a motor, to the motor at high speed within a short time, thereby removing hysteresis of a current sensor which measures the current applied to the motor.

Another embodiment of the present invention is directed to an apparatus and method for removing hysteresis of MDPS, which applies a current having an asynchronous frequency, which does not coincide with a synchronous frequency of a motor, to the motor at high speed within a short time during a key on or off of a vehicle, thereby offsetting hysteresis to reduce a torque ripple of the MDPS.

In one embodiment, an apparatus for removing hysteresis of MDPS may include: a motor driving unit for rotating a motor; a key on/off sensing unit for sensing a key on/off of a vehicle; and an ECU for receiving a key off state of the vehicle from the key on/off sensing unit and repeating a sweep function a preset number of times. The sweep function may include applying a current having an asynchronous frequency, which does not coincide with a synchronous frequency of the motor, to the motor through the motor driving unit.

The sweep function may include applying the current having an asynchronous frequency to the motor while alternating the direction of the current one or more times.

The sweep function may include applying the current having an asynchronous frequency in the opposite direction of magnetic flux, when the current is first applied to the motor.

The sweep function may include applying the current having an asynchronous frequency in a sine wave form such that the current is gradually decreased.

The sweep function may include applying the current having an asynchronous frequency in a square wave form such that the current is decreased in a multi-step manner.

In another embodiment, a method for removing hysteresis of MDPS may include: sensing, by an ECU, a key on/off; repeating, by the ECU, a sweep function a preset number of times, when a key off is sensed, wherein the sweep function comprises applying a current having an asynchronous frequency, which does not coincide with a synchronous frequency of a motor, to the motor; and blocking, by the ECU, the current applied through the motor driving unit, when the sweep function was repeated the preset number of times.

The repeating of the sweep function may include applying the current having an asynchronous frequency to the motor while alternating the direction of the current one or more times.

The repeating of the sweep function may include applying the current having an asynchronous frequency in the opposite direction of magnetic flux, when the current is first applied to the motor.

The repeating of the sweep function may include applying the current having an asynchronous frequency in a sine wave form such that the current is gradually decreased.

The repeating of the sweep function may include applying the current having an asynchronous frequency in a square wave form such that the current is decreased in a multi-step manner.

The apparatus and method for removing hysteresis of MDPS in accordance with the embodiment of the present invention may apply the current having an asynchronous frequency, which does not coincide with the synchronous frequency of the motor, to the motor at high speed within a short time, and remove hysteresis of the current sensor which measures a current applied to the motor before the motor is driven. Thus, since the hysteresis does not affect a steering feel of a driver, the reliability of the apparatus may be improved.

Furthermore, during a key on or off, the current having an asynchronous frequency which does not coincide with the synchronous frequency of the motor may be applied at high speed within a short time, in order to offset hysteresis. Then, a torque ripple which inevitably occurs in a motor controller and the ECU using the current sensor may be reduced to thereby remove a current error caused by hysteresis.

Furthermore, the sweep function may be implemented to be performed within a short time of 0.5 during a key on or off. Thus, since hysteresis may be removed through an algorithm without changing hardware, a torque ripple may be reduced to cut down the development cost and maintenance cost.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
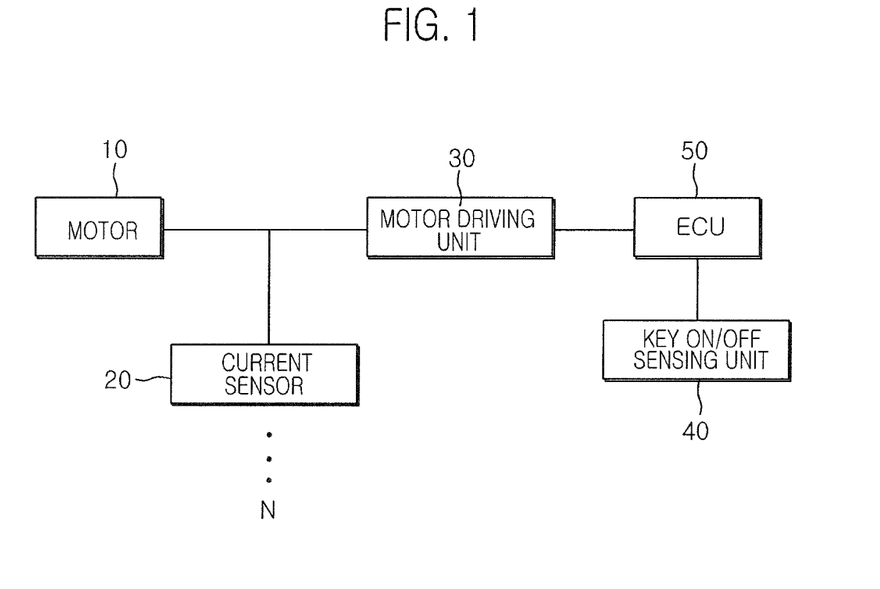
FIG. 1 is a block configuration diagram illustrating an apparatus for removing hysteresis of MDPS in accordance with an embodiment of the present invention.
Figure 2:
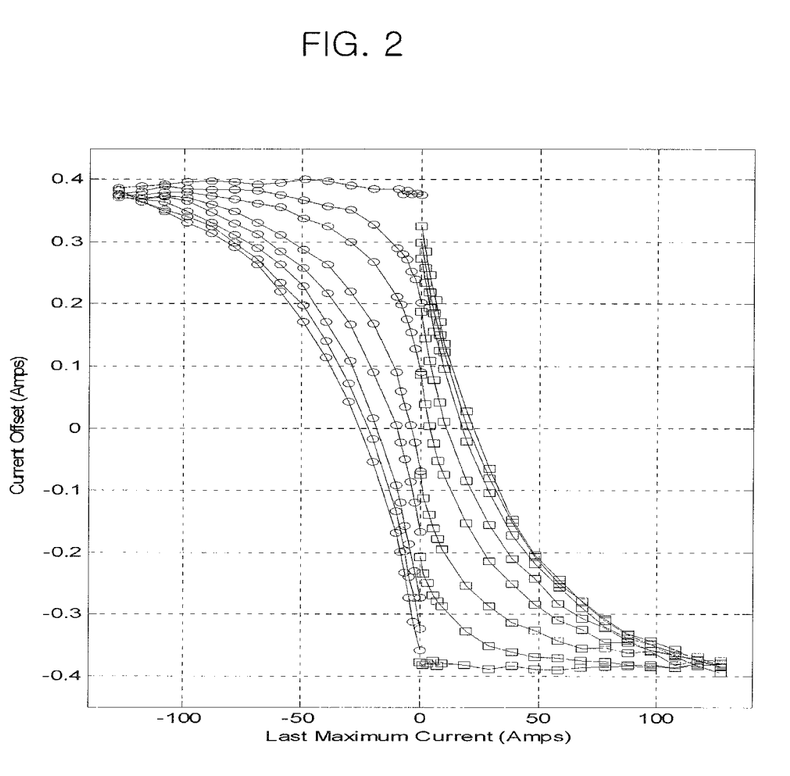
FIG. 2 is a diagram illustrating hysteresis of a current sensor.
Figure 3:
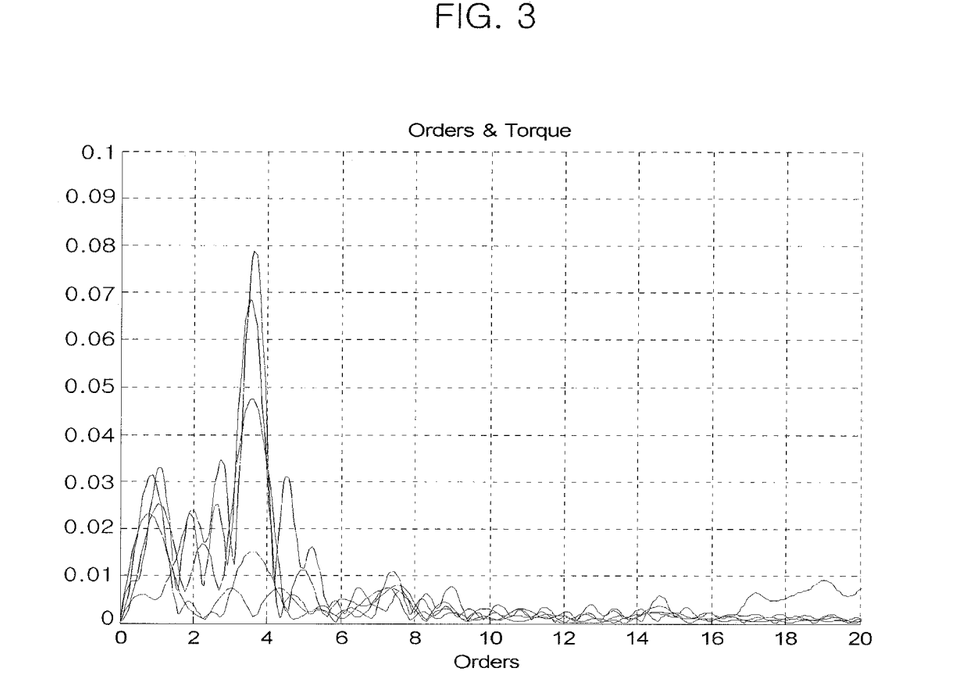
FIG. 3 is a graph illustrating a torque ripple caused by the hysteresis of the current sensor.

FIG. 1 is a block configuration diagram illustrating an apparatus for removing hysteresis of MDPS in accordance with an embodiment of the present invention. FIG. 2 is a diagram illustrating hysteresis of a current sensor. FIG. 3 is a graph illustrating a torque ripple caused by the hysteresis of the current sensor.

Figure 4:
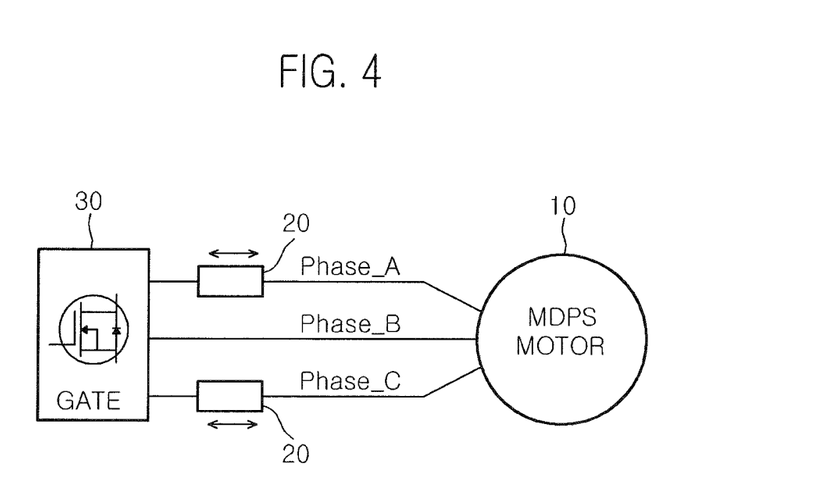
FIG. 4 is a diagram for explaining a motor driving unit and a current sensor in the apparatus for removing hysteresis of MDPS in accordance with the embodiment of the present invention.
Figure 5:
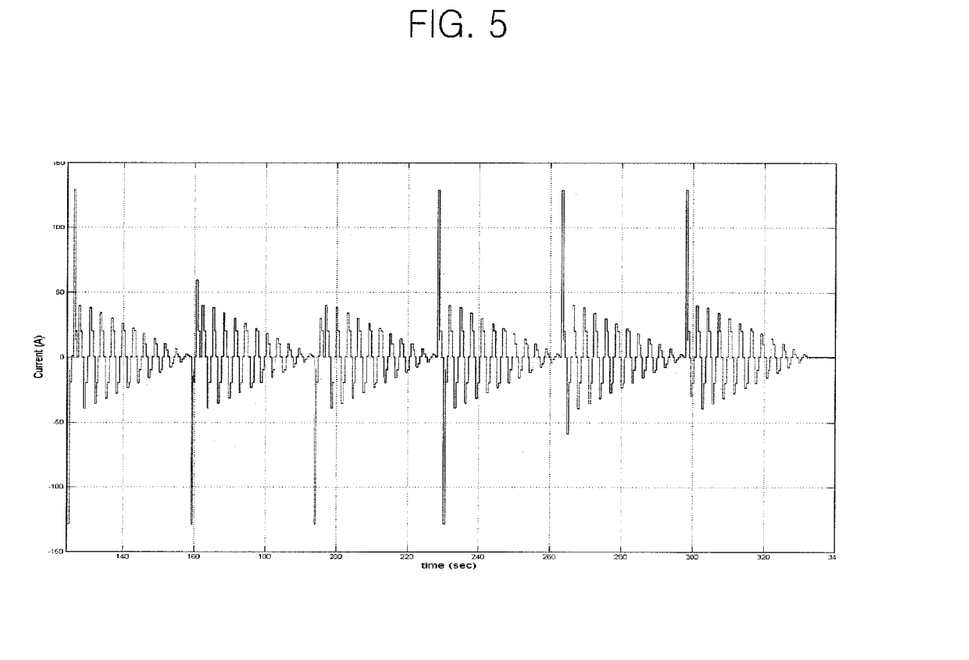
FIG. 5 is a graph illustrating the waveform of a current applied to a motor, when a sweep function is performed.

FIG. 4 is a diagram for explaining a motor driving unit and a current sensor in the apparatus for removing hysteresis of MDPS in accordance with the embodiment of the present invention. FIG. 5 is a graph illustrating the waveform of a current applied to a motor, when a sweep function is performed.

Figure 6:
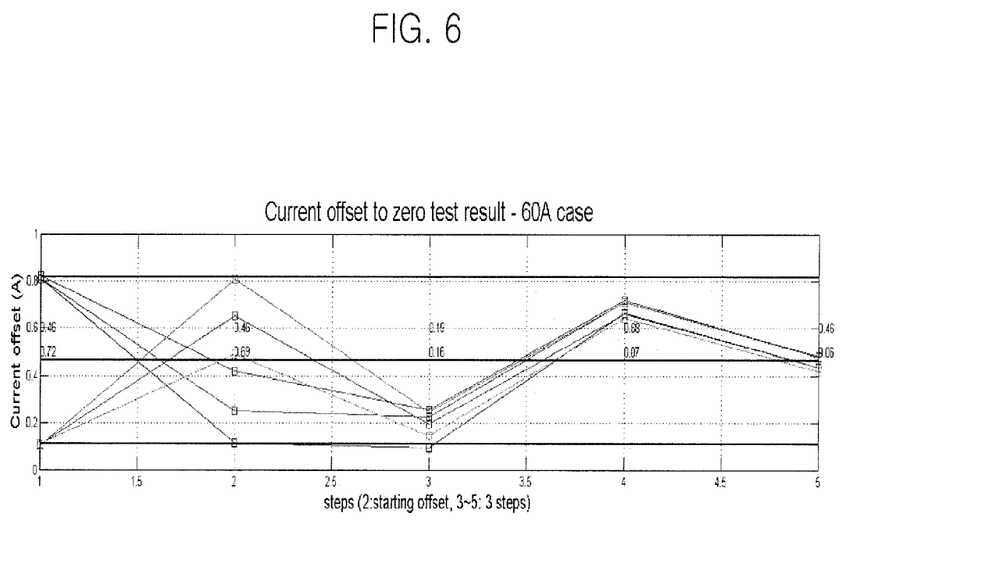
FIG. 6 is a graph illustrating an actual test result obtained by applying the apparatus for removing hysteresis of MDPS in accordance with the embodiment of the present invention.
Figure 7A:
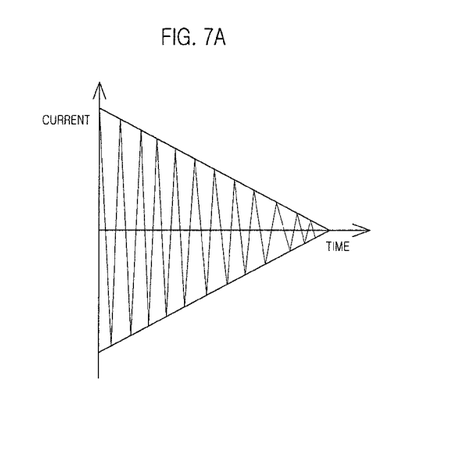
FIGS. 7A, 7B, 7C and 8 are diagrams illustrating examples of current sweep waveforms of the apparatus for removing hysteresis of MDPS in accordance with the embodiment of the present invention.
Figure 7B:
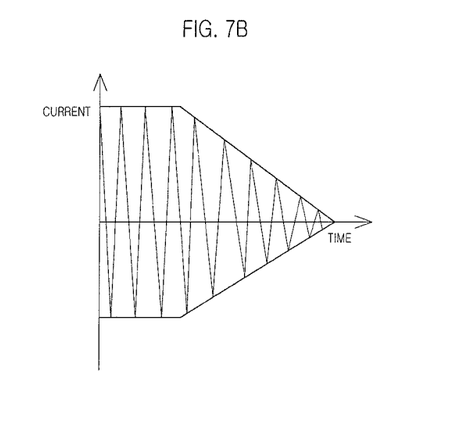
Figure 7C:
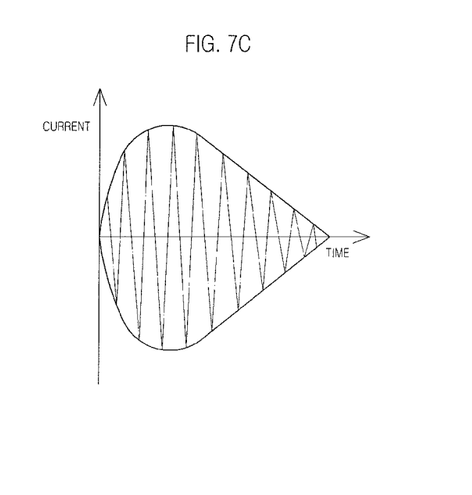
Figure 8:
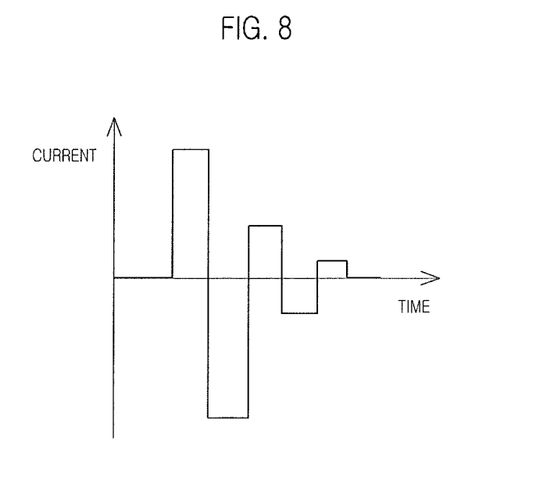

FIG. 6 is a graph illustrating an actual test result obtained by applying the apparatus for removing hysteresis of MDPS in accordance with the embodiment of the present invention. FIGS. 7 and 8 are diagrams illustrating examples of current sweep waveforms of the apparatus for removing hysteresis of MDPS in accordance with the embodiment of the present invention.

As illustrated in FIG. 1, the apparatus for removing hysteresis of MDPS in accordance with the embodiment of the present invention may include a motor 10, a current sensor 20, a motor driving unit 30, a key on/off sensing unit 40, and an electronic control unit (ECU) 50.

The motor 10 may include a synchronous motor for generating assist torque of the MDPS, and a three phase motor may be applied as the motor 10.

The current sensor 20 may sense a current applied to the motor 10. More specifically, the current sensor 20 may convert the magnitude of a current applied to the motor into an induced magnetization, and output the induced magnetization as a current.

At this time, hysteresis may remain due to the property of the current sensor 20. Thus, when the applied current becomes zero, the induced magnetization may not converge to zero, but a current offset deviation may occur as illustrated in FIG. 2.

Furthermore, as illustrated in FIG. 3, a torque ripple may be caused by the hysteresis, depending on the poles of the motor 10. In an eight-pole motor 10, a fourth-order ripple may occur, and in a six-pole motor 10, a third-order ripple may occur.

The motor driving unit 30 may apply a current having a synchronous frequency to the motor 10 so as to rotate the motor 10. Furthermore, when an FET switch is driven to turn off a gate for applying a current to the motor 10, the motor driving unit 30 may block the current applied to the motor 10 so as to stop the rotation of the motor 10.

That is, as illustrated in FIG. 4, the motor driving unit 30 may include an inverter which controls a frequency to convert the RPM of the motor 10, and two or more current sensors 20 may be used for sensing a current of the three-phase motor 10.

The key on/off sensing unit 40 may sense a key on/off of the vehicle.

When a key off is sensed through the key on/off sensing unit 40, the ECU 50 may apply a current having an asynchronous frequency, which does not coincide with the synchronous frequency of the motor 10, to the motor 10, in order to perform a sweep function of removing the hysteresis of the current sensor 20.

More specifically, the ECU 50 may apply a current at a larger frequency by 50 Hz or more than when the motor 10 is stopped.

That is, the apparatus for removing hysteresis of MDPS in accordance with the embodiment of the present invention may remove hysteresis during a key off, such that a driver does not feel a sense of difference in steering.

Furthermore, the sweep function may be performed before a current offset is calculated, during a key on, but may be performed during a key off.

As illustrated in FIG. 5, the sweep function may be performed by alternating the direction of the current having an asynchronous frequency, applied to the motor 10, one or more times.

FIG. 6 illustrates a test result obtained by applying the apparatus for removing hysteresis of MDPS in accordance with the embodiment of the present invention. Referring to FIG. 6, a current of 60A may be applied to the motor 10 while the direction of the current is alternated four times. Then, as the current offset converges to zero, hysteresis may be removed.

Furthermore, the sweep function may be performed by applying the current having an asynchronous frequency in a sine wave form to the motor 10, as illustrated in FIGS. 7A to 7C. At this time, the magnitude of the current may be gradually decreased.

More specifically, as illustrated in FIG. 7A, the current having an asynchronous frequency may be applied in such a manner that the magnitude thereof is gradually decreased from the maximum current so as to converge to zero. Alternatively, as illustrated in FIG. 7B, the current having an asynchronous frequency may be applied in such a manner that the magnitude thereof is maintained at the maximum current for a predetermined time and then gradually decreased to converge to zero. Alternatively, as illustrated in FIG. 7C, the current having an asynchronous frequency may be applied like a curved window similar to a sine wave or a half cycle of a sine wave, such that the magnitude thereof converges to zero.

At this time, when the current having an asynchronous frequency is first applied to the motor 10, the current may be applied in the opposite direction of magnetic flux, that is, the −d axis direction of the motor 10 such that an abnormal operation does not occur.

Furthermore, the sweep function may be performed by applying the current having an asynchronous frequency in a square wave form to the motor 10, as illustrated in FIG. 8. At this time, the magnitude of the current may be decreased in a multi-step manner.

More specifically, the sweep function may be repeated three or more times until the current converges to zero. Similarly, when the current having an asynchronous frequency is first applied to the motor 10, the current may be applied in the opposite direction of magnetic flux, that is, the −d axis direction of the motor 10 such that an abnormal operation does not occur.

When the sweep function is repeated a preset number of times, the ECU 50 may block the current applied to the motor through the motor driving unit 30.

Figure 9:
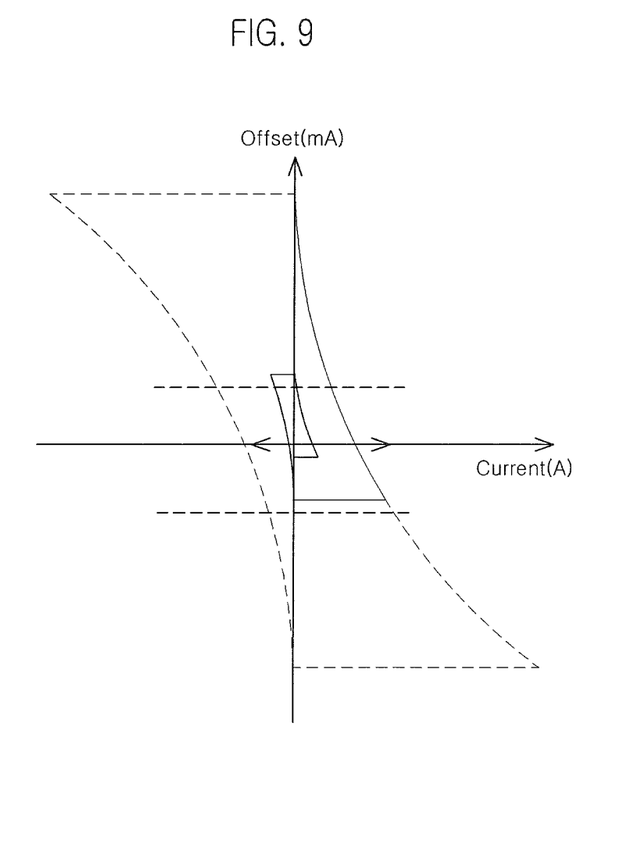
FIGS. 9 and 10 are graphs illustrating a case in which an offset current is distorted over the limit and a case in which an offset current exists within the limit, respectively.
Figure 10:
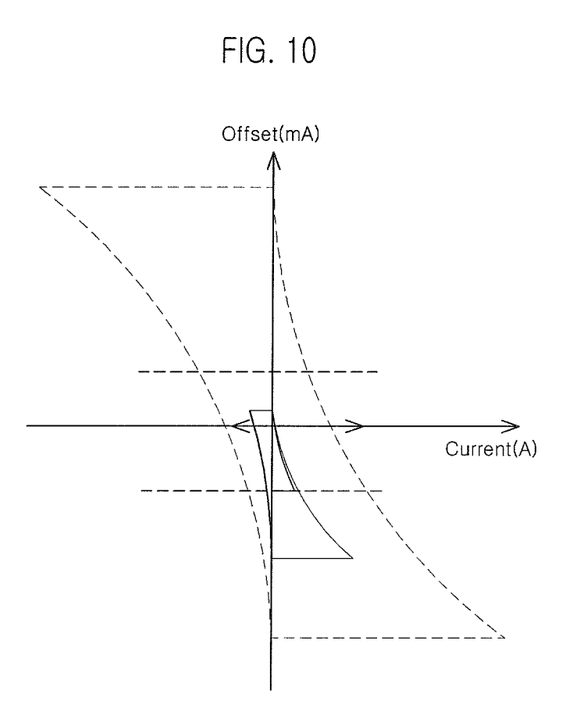

FIGS. 9 and 10 are graphs illustrating a case in which an offset current is distorted over the limit and a case in which an offset current exists within the limit, respectively.

The apparatus for removing hysteresis of MDPS in accordance with the embodiment of the present invention may remove hysteresis such that the offset converges within the limit, regardless of the case in which the offset current is distorted over the limit and the case in which the offset current exists within the limit.

Figure 11A:
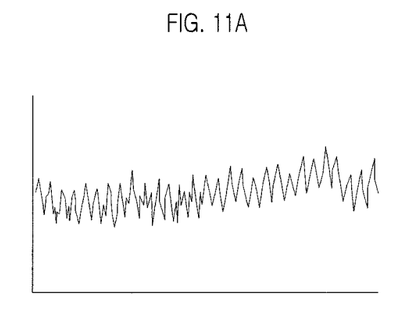
FIGS. 11A to 11C are diagrams illustrating the process of removing hysteresis of MDPS in accordance with an embodiment of the present invention.
Figure 11B:
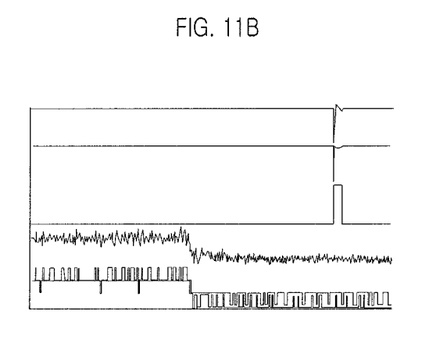
Figure 11C:
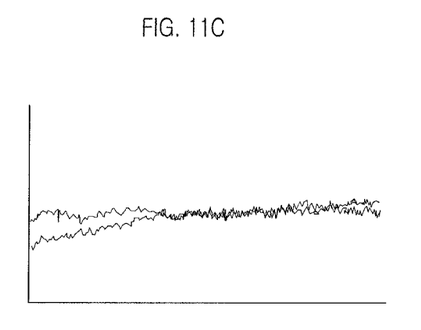

FIGS. 11A to 11C are diagrams illustrating the process of removing hysteresis of MDPS in accordance with an embodiment of the present invention.

More specifically, when a torque ripple occurs as an offset current is distorted as illustrated in FIG. 11A, the sweep function may be performed during a key off as illustrated in FIG. 11B. Then, as illustrated in FIG. 11C, the torque ripple may be reduced during steering, after a key on.

Figure 12:
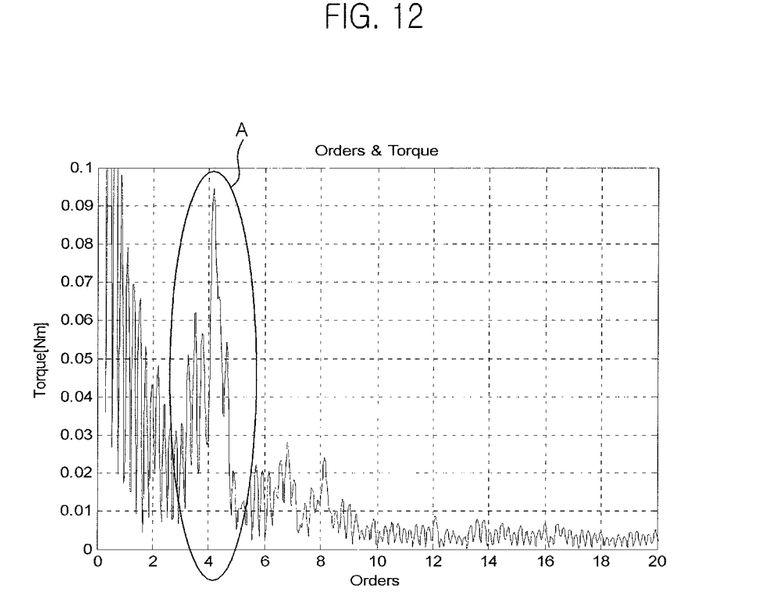
FIGS. 12 and 13 are graphs comparing torque ripples before and after the apparatus for removing hysteresis of MDPS in accordance with the embodiment of the present invention is applied.
Figure 13:
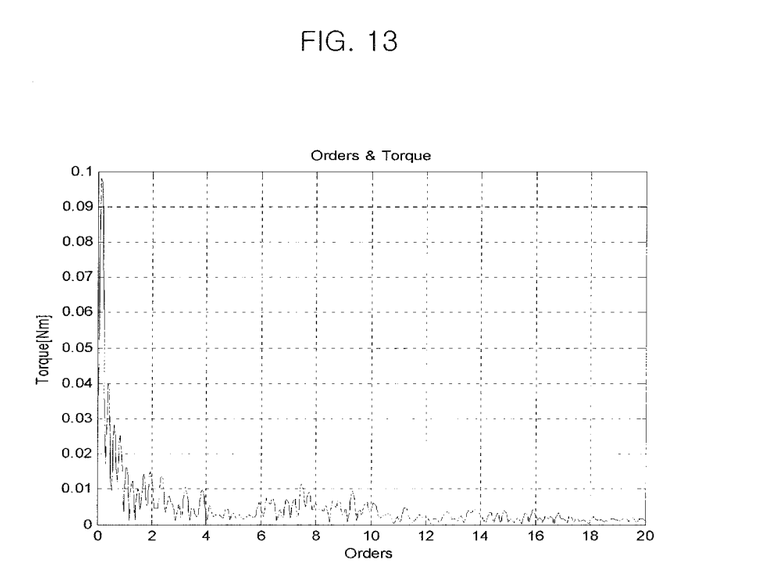

FIGS. 12 and 13 are graphs comparing torque ripples before and after the apparatus for removing hysteresis of MDPS in accordance with the embodiment of the present invention is applied.

Referring to FIG. 12, a torque ripple A may occur due to an offset caused by hysteresis, before the apparatus for removing hysteresis of MDPS in accordance with the embodiment of the present invention is applied. Referring to FIG. 13, however, the torque ripple A may be significantly reduced after the apparatus for removing hysteresis of MDPS in accordance with the embodiment of the present invention is applied.

As described above, the apparatus for removing hysteresis of MDPS in accordance with the embodiment of the present invention may apply the current having an asynchronous frequency, which does not coincide with the synchronous frequency of the motor, to the motor at high speed within a short time, and remove hysteresis of the current sensor which measures a current applied to the motor before the motor is driven. Thus, since the hysteresis does not affect a steering feel of a driver, the reliability of the apparatus may be improved.

Furthermore, during a key on or off, the current having an asynchronous frequency which does not coincide with the synchronous frequency of the motor may be applied at high speed within a short time, in order to offset hysteresis. Then, a torque ripple which inevitably occurs in a motor controller and the ECU using the current sensor may be reduced to thereby remove a current error caused by hysteresis.

Furthermore, the sweep function may be implemented to be performed within a short time of 0.5 during a key on or off. Thus, since hysteresis may be removed through an algorithm without changing hardware, a torque ripple may be reduced to cut down the development cost and maintenance cost.

Figure 14:
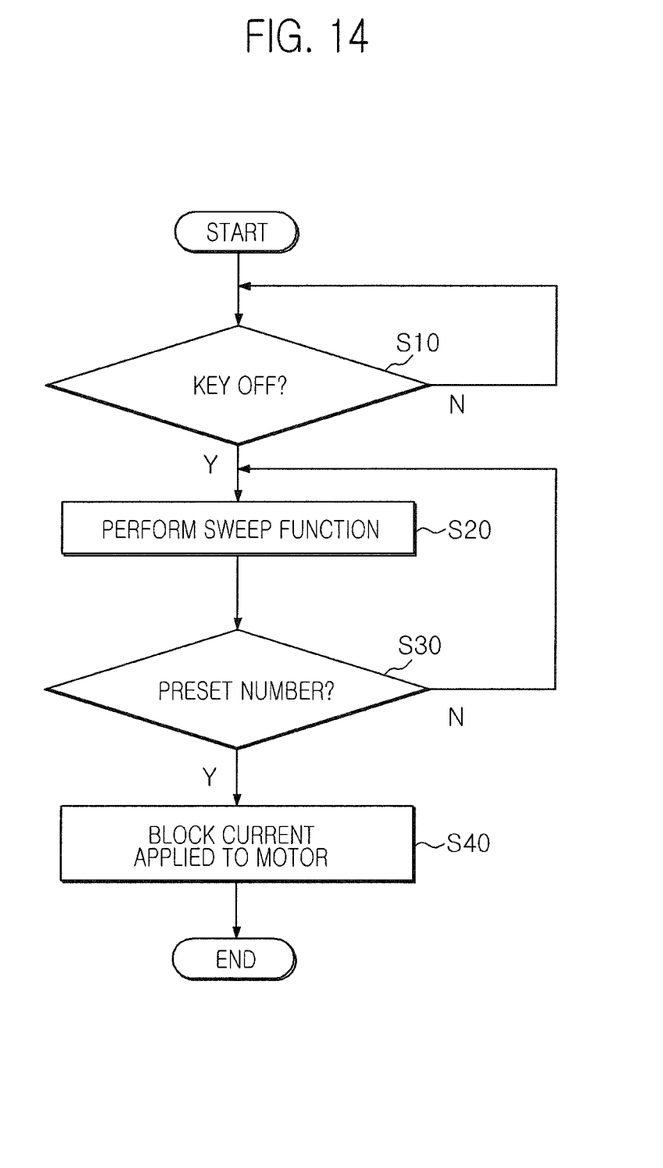
FIG. 14 is a flowchart illustrating a method for removing hysteresis of MDPS in accordance with an embodiment of the present invention.

FIG. 14 is a flowchart illustrating a method for removing hysteresis of MDPS in accordance with an embodiment of the present invention. Referring to FIG. 14, the method for removing hysteresis of MDPS in accordance with the embodiment of the present invention will be described in detail.

First, the ECU 50 may sense a key on/off through the key on/off sensing unit 40 at step S10.

When a key off is sensed as the sensing result of step S10, the ECU 50 may perform a sweep function at step S20. Specifically, the ECU 50 may apply a current having an asynchronous frequency, which does not coincide with a synchronous frequency of the motor 10, to the motor 10 so as to remove hysteresis of the current sensor 20.

At step S20, the sweep function may be performed by alternating the direction of the current having an asynchronous frequency one or more times, when the current is applied to the motor 10.

Alternatively, the sweep function may be performed by applying the current having an asynchronous frequency in the opposite direction of magnetic flux, when the current is first applied to the motor 10.

That is, the current may be applied in the opposite direction of magnetic flux, that is, the −d axis direction of the motor 10 such that an abnormal operation does not occur.

At step 20, the sweep function may be performed by applying the current having an asynchronous frequency in a sine wave form to the motor 10. At this time, the magnitude of the current may be gradually decreased.

Furthermore, the sweep function may be performed by applying the current having an asynchronous frequency in a square wave form to the motor 10. At this time, the current may be decreased in a multi-step manner.

At step S30, the ECU 50 may determine whether or not the sweep function was performed a preset number of times. When the sweep function was performed the preset number of times, the ECU may block the current applied to the motor 10 through the motor driving unit 30, at step S40.

As described above, the method for removing hysteresis of MDPS in accordance with the embodiment of the present invention may apply the current having an asynchronous frequency, which does not coincide with the synchronous frequency of the motor, to the motor at high speed within a short time, and remove hysteresis of the current sensor which measures a current applied to the motor before the motor is driven. Thus, since the hysteresis does not affect a steering feel of a driver, the reliability of the apparatus may be improved.

Furthermore, during a key on or off, the current having an asynchronous frequency which does not coincide with the synchronous frequency of the motor may be applied at high speed within a short time, in order to offset hysteresis. Then, a torque ripple which inevitably occurs in a motor controller and the ECU using the current sensor may be reduced to thereby remove a current error caused by hysteresis.

Furthermore, the sweep function may be implemented to be performed within a short time of 0.5 during a key on or off. Thus, since hysteresis may be removed through an algorithm without changing hardware, a torque ripple may be reduced to cut down the development cost and maintenance cost.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An apparatus for removing hysteresis of motor driven power steering (MDPS), comprising:
   a motor;
   a key on/off sensor configured for sensing a key on state or a key off state of a vehicle; and
   an electronic control unit (ECU) configured for receiving the key off state of the vehicle from the key on/off sensor and for repeating a sweep function a preset number of times,
   wherein the sweep function comprises applying a current having an asynchronous frequency, which does not coincide with a synchronous frequency of the motor, to the motor while alternating direction of the current one or more times.

2. The apparatus of claim 1, wherein the current having an asynchronous frequency is in a sine wave form such that the current is gradually decreased.

3. A method for removing hysteresis of MDPS, comprising:
   ng the apparatus of claim 1;
   sensing, by the key on/off sensor, the key off state or the key on state of the vehicle;
   repeating, by the ECU, the sweep function the preset number of times when the key off state is sensed, wherein the sweep function comprises applying, to the motor, the current having an asynchronous frequency, which does not coincide with a synchronous frequency of the motor, while alternating direction of the current one or more times; and
   blocking, by the ECU, the current applied to the motor, when the sweep function has repeated the preset number of times.

4. The method of claim 3, wherein the current having an asynchronous frequency is in a sine wave form such that the current is gradually decreased.

5. An apparatus for removing hysteresis of motor driven power steering (MDPS), comprising:
   a motor;
   a key on/off sensor configured for sensing a key on state or a key off state of a vehicle; and
   an electronic control unit (ECU) configured for receiving the key off state of the vehicle from the key on/off sensor and for repeating a sweep function a preset number of times,
   wherein the sweep function comprises applying, to the motor, a current having an asynchronous frequency, which does not coincide with a synchronous frequency of the motor, in the opposite direction of magnetic flux, when the current is first applied to the motor.

6. A method for removing hysteresis of MDPS, comprising:
   ng the apparatus of claim 5;
   sensing, by the key on/off sensor, the key off state or the key on state of the vehicle;
   repeating, by the ECU, the sweep function the preset number of times when the key off state is sensed, wherein the sweep function comprises applying, to the motor, the current having an asynchronous frequency, which does not coincide with a synchronous frequency of the motor, in the opposite direction of magnetic flux, when the current is first applied to the motor; and
   blocking, by the ECU, the current applied to the motor, when the sweep function has repeated the preset number of times.

7. An apparatus for removing hysteresis of motor driven power steering (MDPS), comprising:
   a motor;
   a key on/off sensor configured for sensing a key on state or a key off state of a vehicle; and
   an electronic control unit (ECU) configured for receiving the key off state of the vehicle from the key on/off sensor and for repeating a sweep function a preset number of times,
   wherein the sweep function comprises applying, to the motor, a current having an asynchronous frequency, which does not coincide with a synchronous frequency of the motor, in a square wave form such that the current is decreased in a multi-step manner.

8. A method for removing hysteresis of MDPS, comprising:
   ng the apparatus of claim 7;
   sensing, by the key on/off sensor, the key off state or the key on state of the vehicle;
   repeating, by the ECU, the sweep function the preset number of times when the key off state is sensed, wherein the sweep function comprises applying, to the motor, the current having an asynchronous frequency, which does not coincide with a synchronous frequency of the motor, in a square wave form such that the current is decreased in a multi-step manner; and
   blocking, by the ECU, the current applied to the motor when the sweep function has repeated the preset number of times.

* * * * *